United States Patent [19]

Hartmann

[11] Patent Number: 4,694,708
[45] Date of Patent: Sep. 22, 1987

[54] SINGLE SPEED TRANSMISSION FOR PEDAL-PROPELLED VEHICLE

[76] Inventor: Dirck T. Hartmann, 4121 Morningstar Dr., Huntington Beach, Calif. 92649

[21] Appl. No.: 845,960

[22] Filed: May 15, 1986

[51] Int. Cl.[4] .......................... F16H 1/28; B62M 1/02
[52] U.S. Cl. .................................... 74/750 B; 74/785; 74/801; 280/260
[58] Field of Search ...................... 74/785, 750 B, 801; 280/260

[56] References Cited

U.S. PATENT DOCUMENTS

| | | | |
|---|---|---|---|
| 613,601 | 11/1898 | Praul | 74/785 |
| 619,118 | 2/1899 | Barnes | 280/260 |
| 705,106 | 7/1902 | MacDonald | 74/801 |
| 707,359 | 8/1902 | Scharbach | 280/238 |
| 1,184,321 | 5/1916 | Chapin | 280/270 |
| 1,506,565 | 8/1924 | Clatworthy | 280/202 |
| 1,798,384 | 3/1931 | Roberds | 280/260 |
| 2,505,464 | 4/1950 | Debuit | 280/260 |
| 3,299,745 | 1/1967 | Toplis | 74/750 B |
| 3,863,503 | 2/1975 | Loeb et al. | 280/238 |
| 3,920,263 | 11/1975 | Bundschuh | 280/236 |
| 3,934,481 | 1/1976 | Foster | 280/236 |
| 4,447,068 | 5/1984 | Brooks | 280/260 |

FOREIGN PATENT DOCUMENTS

| | | | |
|---|---|---|---|
| 0010201 | 4/1980 | European Pat. Off. | |
| 72169 | 12/1893 | Fed. Rep. of Germany | 74/305 |
| 323459 | 11/1902 | France | 74/785 |
| 945484 | 5/1949 | France | 74/785 |

Primary Examiner—Rodney H. Bonck
Assistant Examiner—David A. Testardi
Attorney, Agent, or Firm—Fulwider, Patton, Rieber, Lee, & Utecht

[57] ABSTRACT

A single speed planetary transmission located inside the wheel hub of a pedal-propelled vehicle such as a bicycle. The transmission is chainless and includes a pair of fixed ring gears, planetary gear carriers mounted for rotation with the drive shaft, planetary gears carried by the gear carriers and meshed with the fixed ring gears, and a sun gear meshed with the planetary gears and coupled to the hub by a conventional free-wheel ratchet mechanism. The transmission provides an optimum gear ratio in a compact, chainless, low maintenance assembly.

2 Claims, 8 Drawing Figures

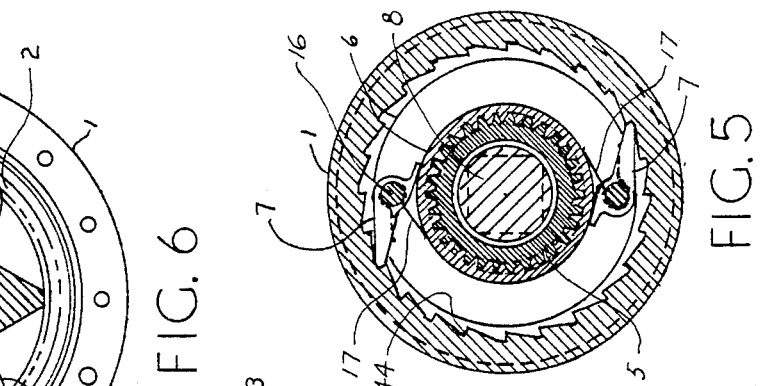
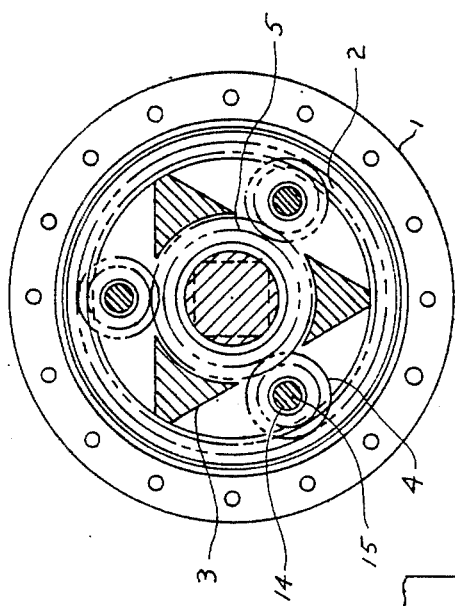
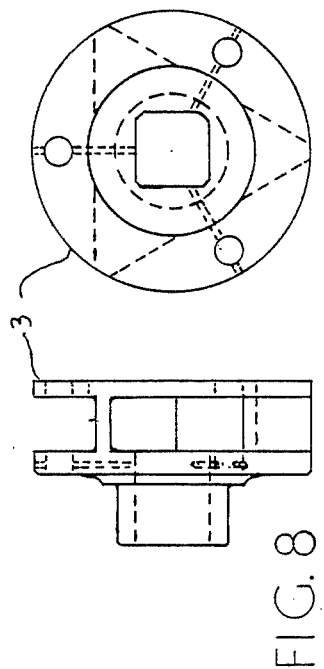
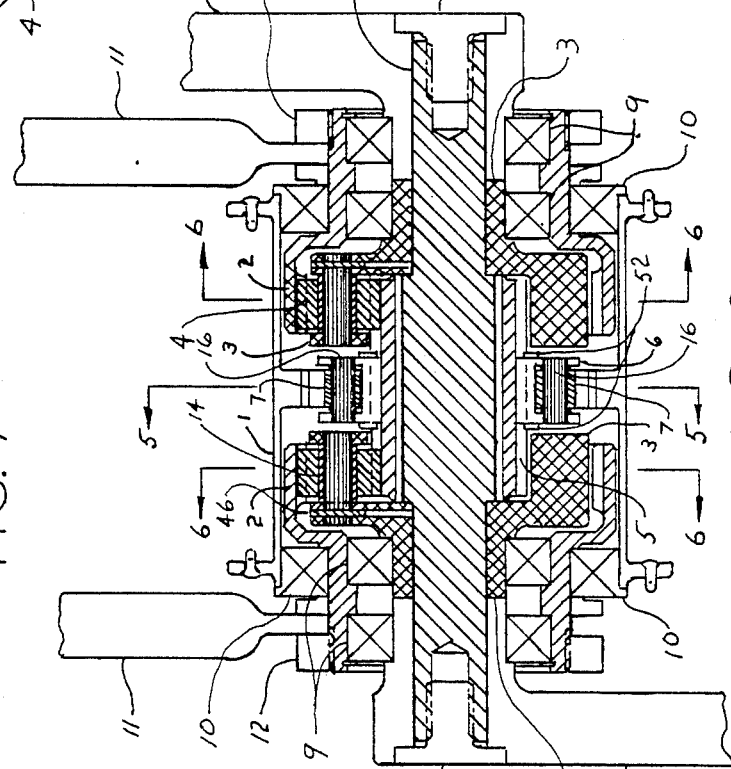
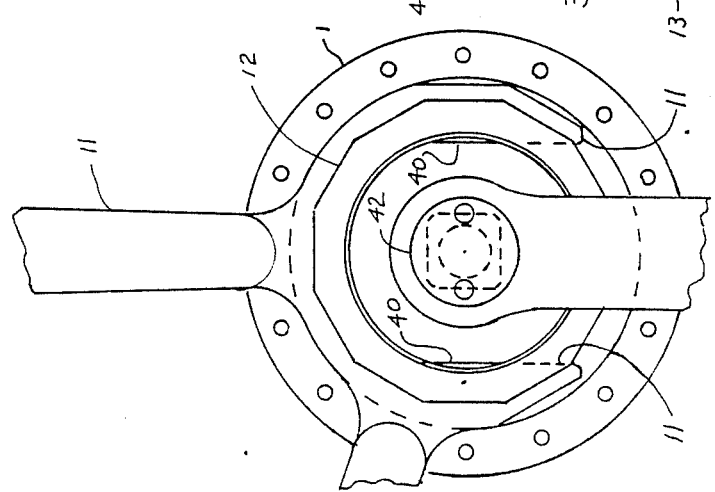

4,694,708

SINGLE SPEED TRANSMISSION FOR PEDAL-PROPELLED VEHICLE

BACKGROUND OF THE INVENTION

1. Field of the Invention

The present invention relates to a single speed, chainless drive transmission for a pedal-propelled vehicle such as a bicycle.

2. Description of the Prior Art

The conventional single speed bicycle drive is characterized by a pedal and crank assembly which rotates a pedal sprocket to drive a chain for rotating a rear sprocket coupled to the wheel hub. The chain requires periodic cleaning for efficient operation and must be removed to change the rear tire. Cleaning is particularly necessary in dusty areas to prevent hard pedaling and premature chain failure.

The chainless drive systems of the prior art are either impractical or excessively complex or costly to manufacture and maintain. U.S. Pat. No. 1,798,384 entitled "Cycle Driving Apparatus", issued Mar. 31, 1931 to G. A. Roberds is typical of one form of chainless drive. The gearing arrangement is chainless and compact if the gear ratio is 1.5 to 1 but must be limited to about 1.7 to 1 or the components become impracticably large. Also, with Roberd's design, there appears no way to change the tire without dismantling the transmission.

SUMMARY OF THE INVENTION

According to the present invention a single speed, chainless drive transmission comprises a pair of ring gears fixed against rotation by the vehicle frame and located within or adjacent the hub of the driving wheel. One or more planetary gear carriers are mounted for rotation by the pedal drive shaft, and a plurality of planetary gears are carried by the carriers in meshing relation with the ring gears.

A sun gear meshed with the planetary gears is coupled to the hub by a conventional free-wheel ratchet mechanism which permits the hub to free wheel independently of the sun gear, or be driven by it, depending upon the relative direction and speed of rotation therebetween.

The transmission is arranged within the hub in compact form or adjacent to it, and can provide practical gear ratios from 2.5 to 1 to 5 to 1 with the maximum pitch diameter for the ring gear less than 3.5 inches. Such a transmission is adapted to easily bear working stresses over many years of hard service with little maintenance. The transmission is applicable to various forms of pedal-propelled vehicles, including not only bicycles, but also tricycles and unicycles.

The arrangement provides a drive which is the operative equivalent of a conventional chain and sprocket drive, but which completely eliminates the chain.

Other aspects and advantages of the present invention will become apparent from the following more detailed description taken in conjunction with the accompanying drawings.

BRIEF DESCRIPTION OF THE DRAWINGS

FIG. 3 is a view of the transmission taken along the line 3—3 of either FIGS. 1 or 2;

FIG. 4 is an end elevational view of the transmission and adjacent components;

FIG. 5 is a view taken along the line 5—5 of FIG. 3;

FIG. 6 is a view taken along either of the lines 6—6 of FIG. 3; and

FIGS. 7 & 8 are, respectively, front and end elevational views of one of the planetary gear carriers.

DESCRIPTION OF THE PREFERRED EMBODIMENT

Figure 1:
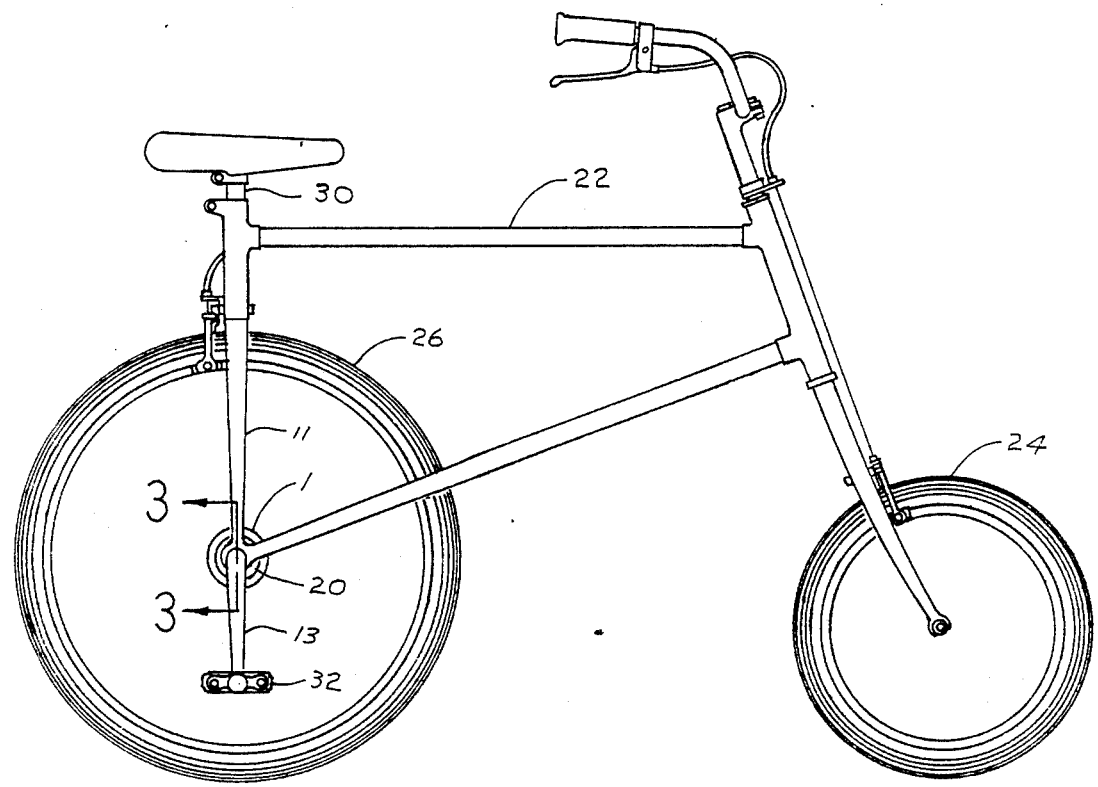
FIG. 1 is a side elevational view of a bicycle having the present transmission fitted at its rear wheel.

Referring now to the drawings, and particularly FIGS. 3 through 8, there is illustrated a single speed, chainless transmission 20 according to the present invention. The transmission 20 provides an optimum gear ratio for small-wheeled, single speed vehicles such as bicycles in a compact assembly providing long service life with little need for attention despite hard usage.

A typical application for the transmission 20 is illustrated in FIG. 1 in which the transmission 20 is associated with a bicycle 22 having a frame 11 characterized by a front wheel 24, a rear wheel 26, and a seat post 30 whose center line intersects the axis of rotation of the rear wheel hub 1 which houses the components of the transmission 20. This arrangement eliminates any need for the usual bicycle chain, the wheel hub 1 being driven through the transmission 20 by operation of the usual pedals 32 and crank arms 13.

Figure 2:
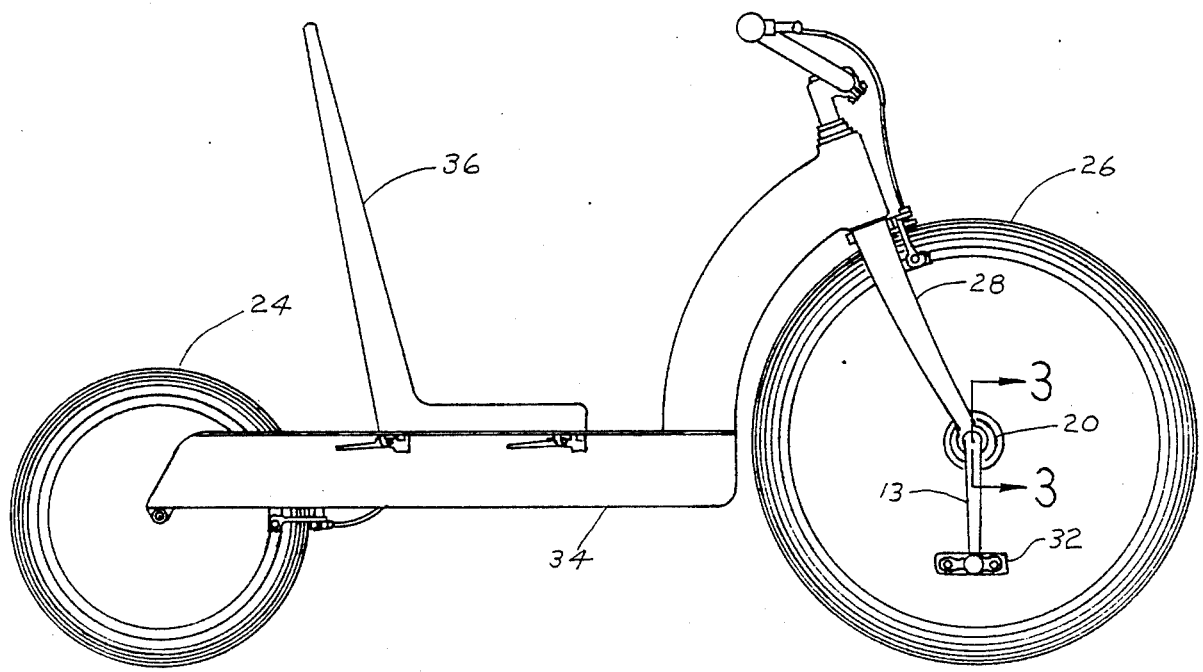
FIG. 2 is a side elevation view of a recumbent bicycle having the present transmission fitted at its front wheel.

FIG. 2 illustrates the same transmission 20 and wheel 26 installed in the front fork 28 of a recumbent bicycle having a frame 34, seat 36 and rear wheel 24.

The transmission 20 is mounted concentric with the axis of rotation of the wheel hub 1 and comprises a pair of axially spaced ring gears 2 in concentric relation within and supporting the wheel hub 1. Each ring gear 2 includes a lesser diameter cylindrical extension having inner seats for a pair of axially spaced inner bearings 9. This cylindrical extension also includes an outwardly directed circumferential seat for a ball bearing 10 which engages and supports the associated end of the wheel hub 1. Further, the outer extremity of the ring gear outer portion is threaded to accept a clamping nut 12.

As seen in FIGS. 3 and 4, the opposite rear portions of the frame 11 include an enlarged fitting which is vertically slotted to complementally mate with vertically oriented flats 40 formed in the exterior of the outer portion of the ring gears 2. This prevents the ring gears 2 from turning.

The outer two bearings 9 at each end of the pedal drive shaft 8 support, respectively, the inwardly directed cylindrical extension of an associated one of the pedal crank arms 13, and the outwardly directed cylindrical extension of an associated one of a pair of planetary gear carriers 3 which are axially spaced upon the pedal drive shaft 8.

The adjacent extensions of the pedal crank arms 13 and the gear carriers 3 include square central openings which receive the square cross-section of the outer extremities of the pedal drive shaft 8. Consequently, driving torque from the crank arms 13 causes the gear carriers 3 to rotate.

Tightening the pair of spanner bolts 42, which fasten the pedal crank arms 13, securely positions the ring gears 2, inner bearings 9, and planetary gear carriers 3.

Tightening the pair of clamping nuts 12 securely positions the wheel bearings 10 and the wheel hub 1.

The wheel hub 1 mounts the usual spokes, rim and tire of the bicycle wheel. In addition, the inner central portion of the hub 1, as best seen in FIGS. 3 and 5, includes a conventional free-wheel ratchet mechanism comprising a circumferentially arranged, inwardly directed portion having a series of ratchet teeth 44 which form part of a free wheeling system, as will be seen.

The inner portion of each gear carrier 3, as best seen in FIGS. 7 and 8, is enlarged and is characterized by a pair of axially spaced disk portions which are integrally connected by three walls to define three spaces for rotatably receiving three planetary gears 4.

The planetary gears 4 are externally toothed and each set of three gears 4 mesh with internal teeth provided on a larger diameter, inwardly directed cylindrical portion of an associated ring gear 2. Since the ring gears 2 are fixed by their attachment to the frame 11, any rotation of the gear carriers 3 causes the planetary gears 4 to rotate on their axes within the fixed ring gears 2 driving the sun gear 5 at a multiplied rate of speed.

An oil impregnated porous bronze bushing 14 is press fitted within each planetary gear 4, and is located between oppositely located openings in the adjacent disk portions of the associated gear carrier 3. Each bushing 14 accepts a polished steel pin 15 which fits within an axial hole through the gear carrier 3. A transverse hole in each pin 15 receives a spring pin 46 which is disposed through a suitable passage in the gear carrier 3 to hold the pin 15 in position.

An externally toothed sun gear 5 is disposed between the gear carriers 3 in concentric relation with the pedal drive shaft 8. It meshes with and is supported in position by the two sets of three planetary gears 4. The sun gear 5 is constrained against axial movement by reason of its engagement with the pair of planetary gear carriers 3.

A separate free-wheel ratchet fitting or channel ring 6, which could be integral with the sun gear 5 if desired, is provided with internal teeth meshing with the external teeth of the sun gear 5 for rotation therewith, as shown in FIG. 5. It is disposed between the sets of planetary gears 4 and is provided with a pair of spring loaded ratchet dogs 7, as seen in FIGS. 3 and 5. Such ratchet dogs 7 and their operation in a freewheeling system is well known and conventionally used on all bicycles.

The dogs 7 are mounted upon the ratchet fitting 6 with the steel pins 16. The wire spring 17 holds the dogs in engagement with the ratchet teeth 44 of the wheel hub 1. This drives the wheel hub when the ratchet fitting 6 is driven at a rate of rotation greater than that of the wheel hub 1. However, when the cyclist stops pedaling or eases the torque upon the pedal drive shaft 8, the wheel hub 1 is enabled to rotate at a rate faster than that of the ratchet fitting 6 in a "free-wheeling" fashion.

The ratchet fitting 6 is axially constrained on the sun gear 5 by a pair of usual snap rings 52.

The gear ratio provided by this planetary arrangement is given by the equation $R = 2(N+n)/N$, where N is the number of teeth in the sun gear 5 and n is the number of teeth in each planetary gear 4. This is shown in the table below.

| N | n | r | Ring gear pitch diameter (inches) |
|---|---|---|---|
| 72 | 18 | 2.5 | 3.75 |
| 36 | 18 | 3.0 | 2.25 |
| 30 | 18 | 3.2 | 2.0625 |

-continued

| N | n | r | Ring gear pitch diameter (inches) |
|---|---|---|---|
| 27 | 21 | 3.56 | 2.156 |
| 27 | 27 | 4.00 | 2.531 |
| 27 | 33 | 4.44 | 2.906 |
| 27 | 42 | 5.11 | 3.469 |

With the three planetary gears 4 located 120 degrees apart, the number of teeth on the sun gear 5 and ring gears 2 should be divisible by three. Thus, a typical arrangement might use 32 pitch gears with 18 teeth on each planetary gear, 30 teeth on the sun gear, and 66 teeth on each ring gear. This provides a gear ratio of 3.2 to 1 and a pitch diameter for each ring gear of 2.062 inches, as illustrated in the table. With this configuration illustrated and the gear sizes mentioned, 32 pitch commercial quality gears of heat treated steel will provide many years of hard usage with minimal maintenance under even the most trying conditions. The installation is compact, durable and characterized by low maintenance and easy operation. Torque transmitted from pedal crank arms 13 is operative to rotate the pedal drive shaft 8, and this torque is transmitted to the pair of gear carriers 3. The consequent planetary rotation of the planetary gears 4 within the ring gears 2 rotates the sun gear 5 at a tangential velocity equal to twice the tangential velocity at the axis of the planetary gears, with this rotation being transmitted by the free wheel system to the wheel hub 1.

Although the use of a pair of ring gears 2 and a pair of gear carriers 3 within the wheel hub 1 is preferred, a single ring gear and gear carrier could be installed in a gear case (not shown) located alongside the wheel hub 1 rather than inside it. This would reduce the number of parts and might reduce the cost of manufacture, but would add to the overall width.

Various other modifications and changes may be made with regard to the foregoing detailed description without departing from the spirit of the invention. It is therefore intended that the following appended claims be interpreted as including all such modifications and alterations as fall within the true scope of the present invention.

I claim:

1. In a pedal-propelled vehicle including a frame, a driving wheel having a hub, and a pedal drive shaft on the axis of said hub for concentric rotation therewith, an improved single speed transmission located within said hub and comprising:

a pair of internally toothed, axially spaced ring gears with an integral cylindrical extension of each of said ring gears fixed to said frame;

a ball bearing seated on each of said integral cylindrical extensions and supporting opposite ends of said hub;

a pair of axially spaced bearings seated inside each of said integral cylindrical extensions for the support of said pedal drive shaft;

a pair of axially spaced planetary gear carriers mounted on said pedal drive shaft for rotation therewith;

three externally toothed planetary gears rotatably mounted 120 degrees apart on each of said planetary gear carriers and meshed with said internally toothed ring gears;

an externally toothed sun gear located between said pair of axially spaced planetary gear carriers and meshed with said planetary gears for support and concentric rotation about said pedal drive shaft; and a conventional free-wheel ratchet means located between said pair of axially spaced ring gears for driving said hub from said sun gear.

2. A transmission according to claim 1 wherein said free-wheel ratchet means includes a channel ring fixed to said sun gear between said planetary gears, a pair of conventional dogs mounted on steel pins in said channel ring, ratchet teeth centrally located on said hub, and conventional wire springs preloading said dogs against said ratchet teeth.

* * * * *